(12) United States Patent
Buehs et al.

(10) Patent No.: US 9,713,958 B2
(45) Date of Patent: Jul. 25, 2017

(54) NON-RAIL-BOUND VEHICLE

(71) Applicant: SIEMENS AKTIENGESELLSCHAFT, Munich (DE)

(72) Inventors: Florian Buehs, Berlin (DE); Juergen Francke, Berlin (DE); Frank Gerstenberg, Berlin (DE); Goeran Keil, Berlin (DE); Holger Schererz, Rehfelde (DE)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 14/652,189

(22) PCT Filed: Nov. 29, 2013

(86) PCT No.: PCT/EP2013/075061
§ 371 (c)(1),
(2) Date: Jun. 15, 2015

(87) PCT Pub. No.: WO2014/090598
PCT Pub. Date: Jun. 19, 2014

(65) Prior Publication Data
US 2015/0321563 A1    Nov. 12, 2015

(30) Foreign Application Priority Data
Dec. 13, 2012   (DE) .................. 10 2012 223 068

(51) Int. Cl.
*B60L 5/26*     (2006.01)
*B60L 5/36*     (2006.01)
(Continued)

(52) U.S. Cl.
CPC ....... *B60L 5/26* (2013.01); *B60L 5/28* (2013.01); *B60L 5/36* (2013.01); *B60L 9/00* (2013.01); *B60L 2200/36* (2013.01)

(58) Field of Classification Search
CPC ....... B60L 5/08; B60L 5/19; B60L 5/18; B60L 5/20; B60L 5/22; B60L 5/24; B60L 5/28; B60L 5/26; B60L 5/36
(Continued)

(56) References Cited

U.S. PATENT DOCUMENTS 4,698,462 A * 10/1987 Gaydarov ................. B60L 5/36
191/51
2010/0121509 A1    5/2010 Takeshima et al.
(Continued)

FOREIGN PATENT DOCUMENTS

DE      69215698 T2    5/1997
DE      100 03 902 A1  8/2001
(Continued)

*Primary Examiner* — Mark Le
(74) *Attorney, Agent, or Firm* — Laurence Greenberg; Werner Stemer; Ralph Locher

(57) ABSTRACT

A non-rail-bound vehicle, in particular a truck, includes a current collector for supplying electric energy from a two-pole overhead conductor. A rocker can be vertically lifted or lowered by a rocking movement of a support extension arm about horizontal tilting axes of lower hinge assemblies and can be laterally displaced by a tilting movement of a support extension arm about vertical pivot axes of the lower hinge assemblies. The lower hinge assemblies are supported on a lifting device which is connected to a vehicle frame of the vehicle and through which the current collector can be vertically moved between a lower parked position and an upper operating position. In this manner, overhead conduc-
(Continued)

tors with an extended height range can be contacted without the current collector influencing the entire length of the vehicle.

10 Claims, 1 Drawing Sheet

(51) Int. Cl.
    *B60L 5/28*     (2006.01)
    *B60L 9/00*     (2006.01)

(58) Field of Classification Search
    USPC ................................ 191/90, 59.1, 50, 66
    See application file for complete search history.

(56) References Cited

U.S. PATENT DOCUMENTS

| | | | |
|---|---|---|---|
| 2011/0106349 A1 | 5/2011 | Sakita | |
| 2012/0037471 A1* | 2/2012 | Schmiedle | ............. B60L 5/12 191/50 |
| 2014/0097054 A1 | 4/2014 | Francke et al. | |
| 2014/0110205 A1 | 4/2014 | Dronnik | |
| 2014/0138200 A1 | 5/2014 | Dronnik et al. | |

FOREIGN PATENT DOCUMENTS

| | | |
|---|---|---|
| DE | 10 2011 076 615 A1 | 11/2012 |
| DE | 10 2011 076 620 A1 | 11/2012 |
| DE | 10 2011 076 623 A1 | 11/2012 |
| EP | 0 697 304 * | 2/1996 |
| EP | 0 693 998 B1 | 12/1996 |

\* cited by examiner

NON-RAIL-BOUND VEHICLE

BACKGROUND OF THE INVENTION

Field of the Invention

The invention relates to a non-rail-bound vehicle, in particular a truck, including a current collector for supplying electric enemy from a two-pole overhead conductor and a frame carrying a rocker with contact strips being movable to establish or interrupt electric sliding contact between the contact strips and the overhead conductor. The frame has at least two support extension arms with catenary-wire ends onto which the rocker is articulated and vehicle-side ends which are supported through lower hinge assemblies on the vehicle frame. The rocker is able to be raised or lowered vertically through a tilting movement of the support extension arms around horizontal tilting axes of the lower hinge assemblies and is able to be deflected laterally through a pivoting movement of the extension support arms around vertical pivot axes of the lower hinge assemblies.

Such a vehicle is known for example from published application DE 10 2011 076 623 A1. The vehicle has a current collector for supplying electric energy from a two-pole overhead conductor, of which catenary wires embodied as outwards and return conductors are able to be contacted in each case by at least one sliding contact strip of the current collector. The current collector has two support extension arms which are articulated onto the vehicle and onto a rocker in each case, carrying the contact strips in a tiltable and hingeable manner such that the rocker is able to be both raised and lowered and is also able to be moved transverse to the direction of travel. This enables the current collector to be coupled onto and decoupled from the catenary wires even at high vehicle speeds. In addition lateral imprecisions in the steering of the vehicle with regard to its lane can be permanently compensated for by the current collector.

A corresponding control for the current collector is known for example from published application DE 10 2011 076 615 A1. The vehicle includes actuator means coupled to the current collector for adjusting the at least one contact strip, wherein the at least one contact strip is aligned horizontally and is able to be adjusted transverse to a vehicle longitudinal axis. The vehicle further includes sensor means for detecting the position of the vehicle relative to the at least one catenary wire. Furthermore the vehicle includes a control device connected to the sensor means and actuator means, which is embodied to activate the actuator means as a function of the position of the vehicle detected by the sensor means such that the at least one contact strip maintains contact to the at least one catenary wire within its working area.

The current collector known from DE 10 2011 076 623 A1 is articulated on the vehicle side between the driver's cab and the load area of the vehicle, wherein the extension arms are aligned forwards from the articulation point—i.e. in the direction of travel, in order not to compete with the load area for space. Because of its limited length the known current collector is only suitable to some degree for establishing sliding contact with overhead wires at different heights. When the overhead wire is disposed quite high, the length of the frame of the current collector would have to be selected so large that the lowered current collector, in the direction of travel of the vehicle, would project beyond the front edge of the driver's cab and would thus change the length of the vehicle.

BRIEF SUMMARY OF THE INVENTION

The underlying object of the invention is therefore to provide a non-rail-bound vehicle of the type stated at the start, of which the current collector is able to be used for energy supply from overhead conductors, even those running at greater heights, wherein the legally prescribed vehicle length is not to be exceeded.

The object is achieved by a generic vehicle provided with the features of the invention. Accordingly the lower hinge assemblies are supported on a lifting device connected to the frame of the vehicle, by means of which the current collector is able to be moved vertically between a lower parked position and an upper operating position. The interaction of two movement mechanisms allows the height range at which the overhead conductors to be contacted are able to be disposed to be increased without increasing the length of the frame of the current collector. In a lower parked position of the lifting device the lowered frame of the current collector can be disposed horizontally close to a roof of the driver's cab. Depending on the height of the overhead wire, the lifting device moves the current collector into an upper operating position which lies at a predeterminable distance from the respective overhead wire.

In this operating position the support extension arms are aligned around a horizontal tilting axis of the lower hinge assemblies, through which the rocker is raised until the contact strips rest against the catenary wires with a defined pressure. For overhead wires disposed higher the operating position can easily be adapted by the lifting device. The length of the current collector thus does not need to be extended, which guarantees that the lowered current collector does not project beyond the front edge of the driver's cab.

In an advantageous form of embodiment of the inventive vehicle a tilt drive for creating the tilting movement is actively connected to the at least two support extension arms in each case. Sprung-mechanical, electrical or fluid drives can be considered as the tilt drive for positioning the frame, especially, because of their low installation space requirements, fluid muscles, the longitudinal extent of which shortens as pressure is applied by the working fluid.

In a preferred embodiment of the inventive vehicle a pivot drive for creating the pivoting movement is directly actively connected to the at least two support extension arms. By comparison with the solution known from DE 10 2011 076 623 A1, which provides the pivoting movement via a separate setting arm driven by a servo motor, the support extension arms are driven directly here.

In an alternate preferred embodiment of the inventive vehicle a pivot drive for creating the pivoting movement is actively connected to at least two support extension arms via a connecting rod. A pivot drive can be provided for a number of support extension arms or also a separate pivot drive for each support extension arm. Here too pivoting of a setting arm is avoided, which would have to transmit the pivoting movement to the support extension arms.

Preferably the pivot drive of the inventive vehicle is embodied as a torque motor or as a geared motor or as a fluid actuator, especially as a fluid muscle. When a fluid actuator is used the required installation space can be designed to be small and the costs can be reduced significantly. A pivot drive embodied as a torque motor or as a geared motor is designed with an elastic transmission element such as a harmonic drive or also a strain wave drive. This type of drive reduces the compressed air demand significantly and leads to a stiffer activation of the support extension arms.

In a preferred form of embodiment of the inventive vehicle the frame has at least one extension support arm which is coupled to the rocker and the lifting device so that an operating plane of the rocker containing the contact strips remains aligned in parallel to the road surface during a tilting movement of the support extension arms and setting arms. The setting arms and adjustment arms thus form a parallelogram guide for the rocker, of which the contact strips are always held in an operating plane parallel to the road surface during raising and lowering of the rocker. This guarantees that the strips make secure contact when sliding along the overhead conductor. As an alternative the frame can also manage without a setting arm, wherein the rocker is held in its operating plane by the pressure of the contact strips on the overhead conductor in a self-guiding manner. The function of the at least one setting arm can however also be fulfilled by at least one cable and/or at least one spring.

In an advantageous embodiment of the inventive vehicle the lifting device is disposed between a driver's cab and a load area of the vehicle, wherein the length of the current collector is dimensioned such that, in its parked position, said collector does not project forwards beyond the driver's cab in the direction of travel of the vehicle. This guarantees that the legally-allowed overall length of the vehicle will not be exceeded by the current collector.

Preferably the current collector, in its parked position, is disposed behind a wind deflector connected to the driver's cab. The wind deflector serves as optical cladding of the lowered current collector and has a positive influence on fuel consumption as a result of better aerodynamic conditions.

In a further advantageous form of embodiment of the inventive vehicle the contact strips for outwards and return conductors of the overhead conductor are attached to a contact strip holder of the rocker connected mechanically but insulating the contact strips electrically from one another. This enables the weight of the rocker to be reduced with comparable stability.

Preferably the rocker is connected via upper hinge assemblies to a least two support extension arms and possibly to at least one setting arm. In such cases the contact strips can be supported on just two spring assemblies. The pivot point of the rocker here is simultaneously the attachment to the extension arms. This merging of functions saves on one module and the corresponding weight.

BRIEF DESCRIPTION OF THE SEVERAL VIEWS OF THE DRAWING

Further advantages and features of the inventive vehicle emerge from the description of an exemplary embodiment given below, which is explained in greater detail with reference to the drawings, in which, in schematic diagrams

DESCRIPTION OF THE INVENTION

Figure 1:
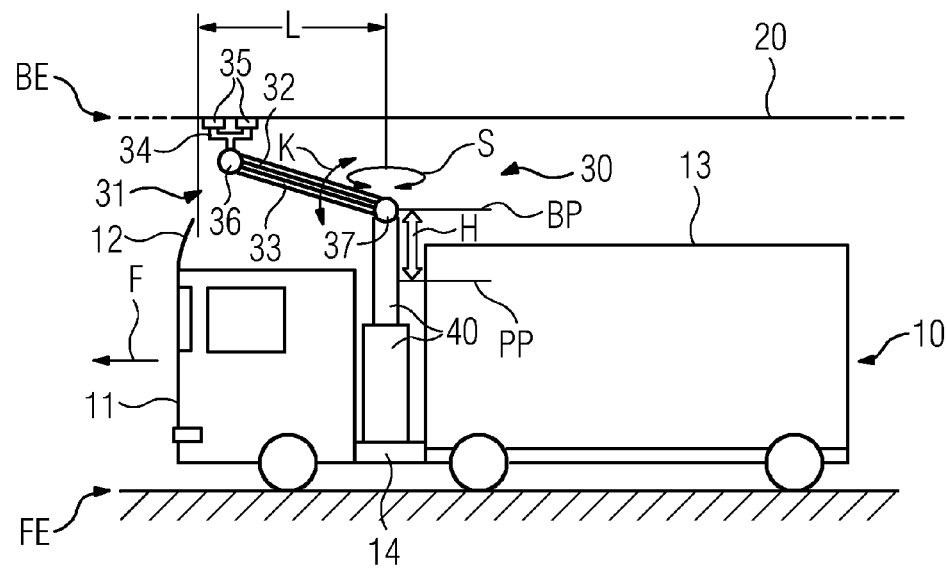
FIG. 1 shows a side view of an inventive vehicle with current collector in contact with the wires and FIG. 2 shows the current collector of the vehicle according to FIG. 1 in a perspective view.

In accordance with FIG. 1 a vehicle 10 embodied as a heavy truck has a driver's cab 11, attached to the edge of which is a wind deflector 12. The vehicle 10 also has a load area 13 as well as a vehicle frame 14 bearing the driver's cab 11 and the load area 13. In addition the vehicle 10 has an electric or diesel-electric traction drive, not shown in the figure. For supply and provision of energy to the traction drive the vehicle 10 has a current collector 30 which is able to be brought into sliding contact with a two-pole overhead conductor of an electrified section of the road. For this purpose the overhead conductor 20 has two catenary wires embodied as outwards and return wires, which are installed at the road side in a manner known per se using masts, side holders, support cabling and hangers. The electric energy within a supply section of the overhead conductor 20 is provided via a connected substation.

Figure 2:
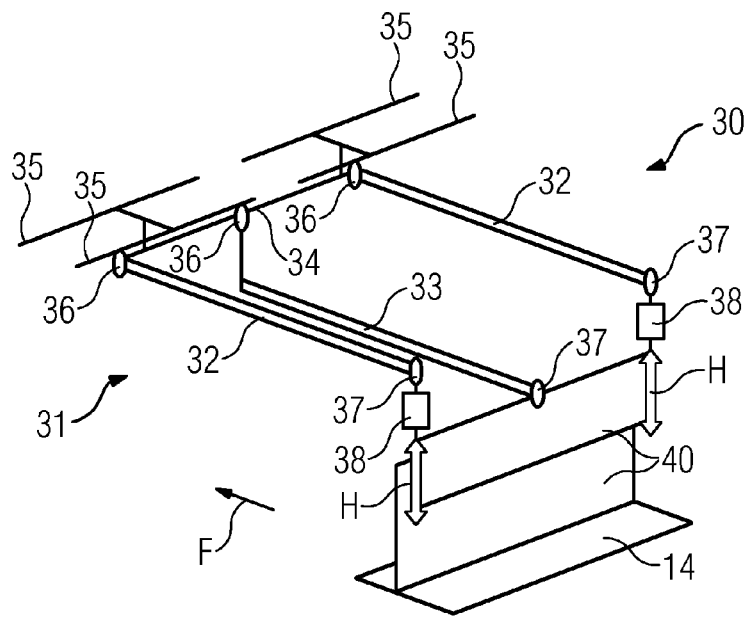

Also in accordance with FIG. 2 the current collector 30 has a frame 31 which comprises two extension support arms 32 of tubular design and disposed in parallel to one another, as well as a setting arm 33 running in parallel to said support arms and which are referred to below jointly as extension arms 32, 33. On the catenary-wire-side ends of the extension arms 32, 33, the frame 31 bears a rocker 34 with contact strips 35, which is pivoted on the frame 31 via upper hinge assemblies 36. On the vehicle-side ends of the support arms 32, 33 the frame 31 of the current collector 30 is connected via hinge assemblies 37 to a lifting device 40. The lower hinge assemblies 37 have tilt axes lying horizontally and at right angles to the direction of travel F of the vehicle 10, around which the support arms 32, 33 can perform a tilting movement K, through which the rocker 34 is able to be raised or lowered. The extension support arms 32 and the setting arm 33 form a parallelogram guide here, which has the effect of enabling the rocker 34 to be raised or lowered such that an operating plane BE containing one of the contact strips 35 is always held parallel to a plane of the road surface FE defined by the road surface. The tilting movement K is effected here by tilt drives for each extension support arm 32 not shown in the figure, which are embodied as fluid muscles for example.

To compensate for steering imprecisions the lower hinge assemblies 37 have vertical pivot axes, around which the extension arms 32, 33 can make a pivoting movement S. Through the pivoting movement S of the frame 31 the rocker 34 of the current collector 30 is adjusted transverse to the direction of travel F. With a control, known per se for example from DE 10 2011 076 615 A1, it is possible to maintain the sliding contact of the contact strips 35 on the catenary wires of the overhead conductor 20 automatically even if the driver is not steering the vehicle precisely in relation to their lane. For this purpose the support extension arms 32 are directly actively connected to a pivot drive 38 in each case, which can be embodied as a torque motor or as a geared motor or as a fluid actuator.

In accordance with the invention the lower hinge assemblies 37 are now supported via a lifting device 40 on the vehicle frame 14. The lifting device 40 comprises a part connected rigidly to the vehicle frame and a mobile part able to be moved vertically by a lifting drive not shown in the figure. Through this vertical lifting movement H the current collector 30 can be moved between a lower parked position PP and an upper operating position BP. In the parked position PP the lowered current collector 30 is disposed above a roof of the driver's cab 11 behind the wind deflector 12, which produces aerodynamic advantages which have a direct influence on the fuel consumption when driving on non-electrified routes. Depending on the height of the overhead conductor 20 to be driven along, the current collector 30 can now be brought into an assigned operating position BP, in order then, by aligning the frame 31, to establish sliding contact between the contact strips 35 of the rocker 34 and overhead conductor 20. Through this the length L of the installed current collector 30 in the parked position PP can be designed short enough for the current collector 30 not to influence the overall length of the vehicle 10.

A major advantage of the inventive current collector 30 lies in its greatly reduced moving mass through the short extension arms 32, 33 and also the correspondingly shortened installation space for the current collector 30 on the vehicle 10. In addition a secure lateral setting movement of the rocker 34 is guaranteed by the pivot drives 38 on at least two support extension arms 32. The lower mass enables the drive power of the pivot drives 38 to be reduced and a more agile movement to be achieved. Furthermore this enables the lifting device 40 to be a lean design.

The invention claimed is:

1. A non-rail-bound vehicle or truck, comprising:
a current collector for supplying electric energy from a two-pole overhead conductor, said current collector having a frame carrying a rocker with contact strips being movable to establish or interrupt electric sliding contact between said contact strips and the overhead conductor;
said frame including at least two support extension arms having catenary-wire ends and vehicle-side ends;
lower hinge assemblies supporting said vehicle-side ends and having horizontal tilting axes and vertical pivot axes;
said rocker being articulated onto said catenary-wire ends, said rocker being configured to be raised or lowered vertically through a tilting movement of said at least two support extension arms around said horizontal tilting axes and said rocker being configured to be deflected laterally through a pivoting movement of said at least two extension support arms around said vertical pivot axes; and
a lifting device connected to a vehicle frame of the vehicle and supporting said lower hinge assemblies for moving said current collector vertically between a lower parked position and an upper operating position;
said frame having at least one setting arm being coupled to said rocker and to said lifting device for keeping an operating plane of said rocker containing said contact strips aligned parallel to a plane of a road surface during said tilting movement of said extension support arms and said at least one setting arm.

2. The vehicle according to claim 1, which further comprises pivot drives each being effectively connected to a respective one of said at least two support extension arms for creating said tilting movement.

3. The vehicle according to claim 1, which further comprises pivot drives each being directly effectively connected to a respective one of said at least two support extension arms for creating said pivoting movement.

4. The vehicle according to claim 1, which further comprises a connecting rod, and a pivot drive effectively connected by said connecting rod to said at least two extension support arms for creating said pivot movement.

5. The vehicle according to claim 3, wherein said pivot drive is a torque motor or a geared motor or a fluid actuator.

6. A non-rail-bound vehicle or truck, comprising:
a vehicle driver's cab; and
a vehicle load area;
a current collector for supplying electric energy from a two-pole overhead conductor, said current collector having a frame carrying a rocker with contact strips being movable to establish or interrupt electric sliding contact between said contact strips and the overhead conductor, and said current collector having an installed length dimensioned to prevent said current collector, in said lower parked position, from projecting forwards beyond said driver's cab in a direction of travel of the vehicle;
said frame including at least two support extension arms having catenary-wire ends and vehicle-side ends;
lower hinge assemblies supporting said vehicle-side ends and having horizontal tilting axes and vertical pivot axes;
said rocker being articulated onto said catenary-wire ends, said rocker being configured to be raised or lowered vertically through a tilting movement of said at least two support extension arms around said horizontal tilting axes and said rocker being configured to be deflected laterally through a pivoting movement of said at least two extension support arms around said vertical pivot axes; and
a lifting device connected to a vehicle frame of the vehicle and supporting said lower hinge assemblies for moving said current collector vertically between a lower parked position and an upper operating position, said lifting device being disposed between said driver's cab and said load area.

7. The vehicle according to claim 6, which further comprises a wind deflector connected to said driver's cab, said current collector, in said lower parked position, being disposed behind said wind deflector.

8. The vehicle according to claim 1, wherein said rocker has a contact strip holder interconnecting but electrically insulating said contact strips for outwards and return conductors of the overhead conductor.

9. The vehicle according to claim 1, which further comprises upper hinge assemblies connecting said rocker to said at least two extension support arms.

10. The vehicle according to claim 1, which further comprises upper hinge assemblies connecting said rocker to said at least two extension support arms and to said at least one setting arm.

* * * * *